US005701319A

United States Patent [19]

Fermann

[11] Patent Number: 5,701,319
[45] Date of Patent: Dec. 23, 1997

[54] METHOD AND APPARATUS FOR GENERATING ULTRASHORT PULSES WITH ADJUSTABLE REPETITION RATES FROM PASSIVELY MODELOCKED FIBER LASERS

[75] Inventor: Martin E. Fermann, Ann Arbor, Mich.

[73] Assignee: Imra America, Inc., Ann Arbor, Mich.

[21] Appl. No.: 546,062

[22] Filed: Oct. 20, 1995

[51] Int. Cl.$^6$ .................................................. H01S 3/098
[52] U.S. Cl. ............................... 372/18; 372/6; 372/11; 372/30
[58] Field of Search ............................ 372/6, 11, 18, 372/25, 30

[56] References Cited

U.S. PATENT DOCUMENTS 4,435,809  3/1984  Tsang et al. ................................ 372/18

*Primary Examiner*—Rodney B. Bovernick
*Assistant Examiner*—Robert E. Wise
*Attorney, Agent, or Firm*—Sughrue,Mion,Zinn,Macpeak & Seas, PLLC

[57] ABSTRACT

The generation of ultrashort pulses with adjustable repetition rates from passively modelocked fiber lasers is demonstrated. By inserting semiconductor saturable absorbers with life-times of the order of 10 nsec into fiber lasers with cavity round-trip times of the order of 100 nsec, passive harmonic modelocking is obtained, leading to the stable generation of pulses at integer multiples of the fundamental cavity frequency. For polarization states that allow for optical limiting of the lasers, pulses are obtained in a frequency range between 20 and 500 MHz., where different repetition rates can be simply selected by changing the pump power level to the cavity. The pulse jitter within one cavity round-trip time is measured to be between 300 psec and 50 psec, where side bands in the frequency domain may be suppressed by up to 70 dB. The saturable absorber acts to both stabilize the cavity repetition rate and to initiate passive modelocking, where nonlinear-polarization evolution is used to sustain modelocking and to suppress amplitude fluctuations of the pulses by providing for optical limiting. Practical embodiments can be obtained by employing environmentally stable cavity designs in polarization preserving single-clad and double clad fibers, where the latter fiber designs allow the pumping of the fiber lasers with broad area-diode array lasers.

42 Claims, 6 Drawing Sheets

METHOD AND APPARATUS FOR GENERATING ULTRASHORT PULSES WITH ADJUSTABLE REPETITION RATES FROM PASSIVELY MODELOCKED FIBER LASERS

FIELD OF THE INVENTION

The present invention is directed to the field of passively modelocked fiber lasers, and more particularly to generating ultrashort pulses with adjustable repetition rates from passively modelocked fiber lasers.

BACKGROUND OF THE INVENTION

Applications of passively modelocked fiber lasers, such as the lasers disclosed in Fermann, Appl. Phys. B, B58, 197 (1994) for instrumentation and sensing, would greatly benefit from the availability of high-average powers or high repetition rates. Unfortunately, erbium fiber lasers in particular typically suffer from strict limitations in both of these areas due to the long fiber lengths that have to be used in the cavities. Though the incorporation of chirped fiber gratings into fiber oscillators can overcome the power limitations as taught by Fermann et al., Opt. Lett., 20, 172 (1995), (at the cost of an increase in pulse width), the limitations in repetition rate still prevail. The same limitations are present in fiber systems based on chirped pulse amplification, as seen in US Patent Appl. Ser. No. 08/445,287, which also adds a great deal of complexity to the laser system.

The average powers of fiber lasers can, however, be increased by increasing the cavity repetition rates by using harmonic modelocking. Early implementations of passive harmonically modelocked systems such as those shown in Yoshida et al., Appl. Phys. Lett., 60, 932 (1992), and Dennis et al., Electron. Lett., 28, 1894 (1992), incorporate a sub-cavity into a passively modelocked fiber laser to increase the repetition rate of the laser. However, sub-cavities lead to intrinsically unstable designs as the phase between the sub- and the main cavity needs to be controlled. Further, the repetition rate is also not adjustable without a change in the length of the sub-cavity. Alternatively, the pulse repetition rates could be stabilized by using an electro-optical modulator in the cavity (C. R. Doerr et al., Opt. Lett., vol. 19, p. 31-33, 1994). In the presence of optical limiting, pulse amplitude fluctuations could be suppressed and stable harmonic modelocking could be obtained without the use of sub-cavities. Note, however, that the use of modulators typically requires expensive drive electronics and cavity length stabilization schemes, as the cavity length has to be electronically locked to the repetition rate of the modulator.

Recently Fermann et al., U.S. Pat. No. 5,414,725, demonstrated a system without a phase-sensitive sub-cavity, where a saturable absorber was positioned asymmetrically within a cavity. The operation principle is similar to having a sub-cavity, as the positioning of the absorber also defines essentially a 'sub-cavity'. However, as the interaction of two pulses in the saturable absorber is dominated by amplitude effects (i.e. the saturable absorber gets preferentially bleached when two pulses collide within its boundaries), the phase of the 'sub-cavity' does not need to be controlled. However, a limitation of the system proposed by Fermann et al. is that the repetition rate is fixed with selection of the positioning of the saturable absorber and is only adjustable by physically moving the intra-cavity elements.

A partial solution to the problem of obtaining an adjustable repetition rate was recently suggested by Grudinin et al., in Electron. Lett., 29, 1860 (1993), who discovered that soliton interactions can induce stable passive harmonic modelocking in fiber lasers. As Grudinin postulated in his original work, it is now generally believed (see A. N. Pilipetskii et al., Opt. Lett., 20, 907 (1995), S. Gray et al., Opt. Lett., 20, 189 (1995)), that long-lived acousto-optic interactions can lead to soliton repulsion between the pulses in a fiber laser; in turn this leads to the build-up of a stable harmonically modelocked pulse train within a time period of a few tens of milliseconds to a few seconds.

However, to date the systems proposed by Grudinin et al. have been impractical as they are highly polarization sensitive and operational only in very long fiber ring-cavities with cavity lengths of 15 m and longer. Clearly, the polarization state of the laser in such long fiber lengths is subject to large environmental drifts, and thus a maximum stable operation time for these lasers of only a few hours is possible. Further, no provision was used by Grudinin et al. to enable optical limiting in the cavity, which is required to stabilize pulse amplitude fluctuations in harmonically modelocked lasers (see C. R. Doerr et al.). As in passive harmonic modelocking the intrapulse repulsion forces are amplitude dependent, the generation of passive harmonically modelocked pulses with low pulse jitter is most valuably assisted by providing for optical limiting.

Further, as the acousto-optic interactions are very weak, any small residual reflections in the cavity tend to completely wash out the effect, i.e. in the presence of small cavity reflections the pulses do not distribute themselves evenly in the cavity, but rather stay together in pulse bunches. As standing-wave cavities intrinsically suffer from higher intracavity reflections, (see K. Tamura et al., Opt. Lett., 18, 220 (1993)), passive harmonic modelocking could thus not be obtained in standing-wave cavities.

Though the systems proposed by Grudinin et al. are capable of generating power levels of a few tens of mW, expensive and impractical pump sources must be used. As the pump power requirements of systems operating at repetition rates of a few hundred MHz can easily call for pump levels of a few hundred milliwatts, the systems taught by Grudinin et al. must employ bulky Ti:sapphire lasers as pump sources. Even when the Ti:sapphire lasers are replaced with master-oscillator power amplifier diode lasers (MOPAs), the system costs are still very high, as MOPAs are very expensive to manufacture.

SUMMARY OF THE INVENTION

It is therefore an object of the present invention to provide a fiber laser capable of inducing harmonic modelocking repeatably in a very stable fashion. It is a further object of the present invention to provide a passively modelocked fiber laser capable of stably generating ultrashort pulses with adjustable repetition rates. According to one embodiment of the present invention a saturable absorber is provided in the laser cavity with a carrier life-time about ten times shorter than the cavity round-trip time. In the presence of optical limiting, the saturable absorber allows harmonic modelocking in standing wave cavities, which in turn allows the use of environmentally stable cavity designs (see Fermann et al., Opt. Lett., 19, 43 (1994)), based on the use of polarization maintaining fiber as part of the fiber cavity. Thus the present invention is highly reliable and can be operated in an essentially hands-off fashion.

It is another object of the present invention to eliminate the need for solid-state pump lasers or MOPAs by incorporating double-clad fibers, as shown in Maurer, U.S. Pat. No. 3,808,549, in the oscillator. As a result, the whole system can be cladding pumped with low-cost diode array lasers. An optimized laser system according to the present invention will allow the generation of average output powers of several tens of mW at repetition rates of up to at least 1 GHz.

BRIEF DESCRIPTION OF THE DRAWINGS

The present invention will be more clearly understood from the following description in conjunction with the accompanying drawings, wherein.

DETAILED DESCRIPTION OF THE PREFERRED EMBODIMENTS

Figure 1:
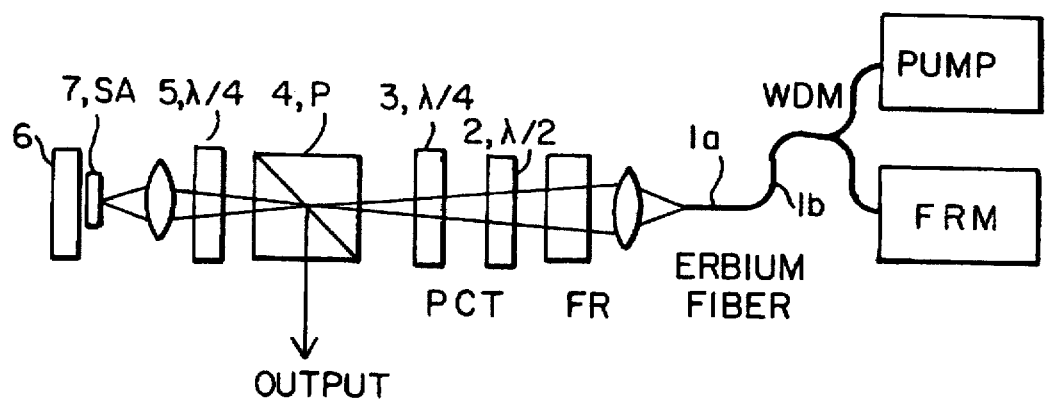
FIG. 1 is a diagram of an environmentally stable passive harmonically modelocked fiber laser according to an embodiment of the present invention.

An embodiment of an environmentally stable passive harmonically modelocked fiber laser is shown in FIG. 1. A ≈14 m length of polarization maintaining erbium-doped fiber 1a is shown, with an Er doping level of around 900 parts per million (in weight). By using another appropriate length of non-polarization maintaining, undoped fiber, the cavity dispersion is adjusted to be slightly negative. The cavity also contains a scheme as shown in Fermann et al., Op. Lett. 19, 43 (1994), for the compensation of linear polarization drifts in the cavity and for the stabilization of nonlinear polarization evolution inside the cavity. In this embodiment, passive modelocking by nonlinear polarization evolution is ensured by an adjustment of the intra-cavity quarter-wave and half-wave plates 2 and 3 located between the fiber end and the intra-cavity polarizer 4. The signal output in this laser is obtained at the intra-cavity polarizer 4, where an adjustable amount of output coupling is obtained by the quarter-wave plate 5 located between the polarizer 4 and the cavity mirror 6. The fiber laser can be pumped with either up to 110 mW at 980 nm from a pig-tailed single-mode laser diode or up to 500 mW from a MOPA laser. To initiate passive modelocking, a semiconductor saturable absorber 7 can be inserted at one end of the cavity, alternatively a moving mirror can be used at one end of the cavity. The semiconductor saturable absorber 7 is based on an epitaxially grown 2 μm film of InGaAsP positioned on a reflective heat sink with carrier life-times between <1 nsec and ≈20 nsec. The carrier life-times of the as grown samples is around 20 nsec and can be shortened to smaller values by proton bombardment. The life-times of the saturable absorbers can be measured with a pump-probe technique.

With a proper adjustment of the polarization state of the laser and for a pump power level of about 15 mW, the use of saturable absorbers with life-times in the range of less than 1 nS–20 nS leads to self-starting passive modelocking at the fundamental cavity repetition rate.

Figure 2:
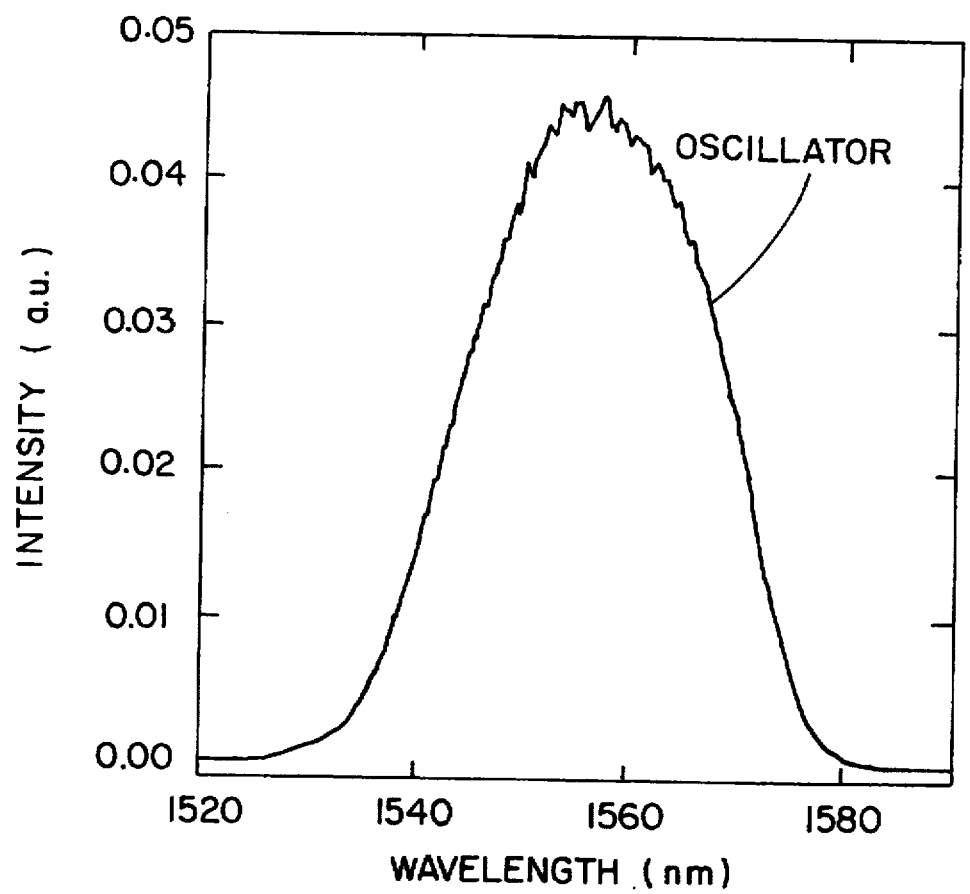
FIG. 2 is a graph of a typical pulse spectrum generated by the embodiment of FIG. 1.

FIG. 2 shows a pulse spectrum generated according to the present invention. The generated pulses have a pulse width of around 200 fsec (assuming a gaussian shape), as determined from autocorrelation traces and are approximately bandwidth-limited. Typically a maximum pulse energy of about 30 pJ is obtainable from the oscillator without compromising its self-starting operation and its reliability.

To verify that saturable absorbers of a certain kind can stabilize passive harmonic modelocking, the following experiments were successfully performed.

1) Increasing the pump power level to the oscillator to levels arbitrarily higher than 15 mW, removing the saturable absorber 7 and using a moving mirror to initiate passive modelocking, large numbers of pulses can be generated within one cavity round-trip time, however, the pulse separation was not uniform, rather the pulses always came in chaotic bunches.

2) Increasing the pump power level to the oscillator to levels arbitrarily higher than 15 mW and using any saturable absorber with carrier life-times ≦5 nsec, led to self-starting passive modelocking again with large numbers of pulses within one cavity round-trip time, where, however, no stable repetition rates were obtainable and the pulses came in chaotic bunches. Note, however, that for a sample with a carrier life-time of ≈5 nsec, a separation of the pulses was sometimes possible, though the jitter between the pulses in one cavity round-trip time was of the order of a few nsec.

3) Increasing the pump power level to the oscillator to levels arbitrarily higher than 15 mW and using saturable absorbers with carrier life-times >5 nsec, led to self-starting passive modelocking again with large numbers of pulses within one cavity round-trip time. However, this time, within a time period of a few seconds, stable passive harmonic modelocking was obtained. Indeed stable passive harmonic modelocking was obtained in a frequency range from 25–250 MHz (in steps of 4.7 MHz), where the higher repetition rate was limited simply by the maximum pump power level obtainable from the MOPA laser.

As the dominant pulse jitter in a passive harmonically modelocked laser is in fact the uncertainty in the relative positioning of the pulses with respect to each other within one cavity round-trip time, the pulse jitter shows up as side-bands in the RF-spectrum at the fundamental cavity frequency. In fact an RF side-band suppression of more than −30 dB was obtained in the whole frequency range from 25–250 MHz.

Figure 3:
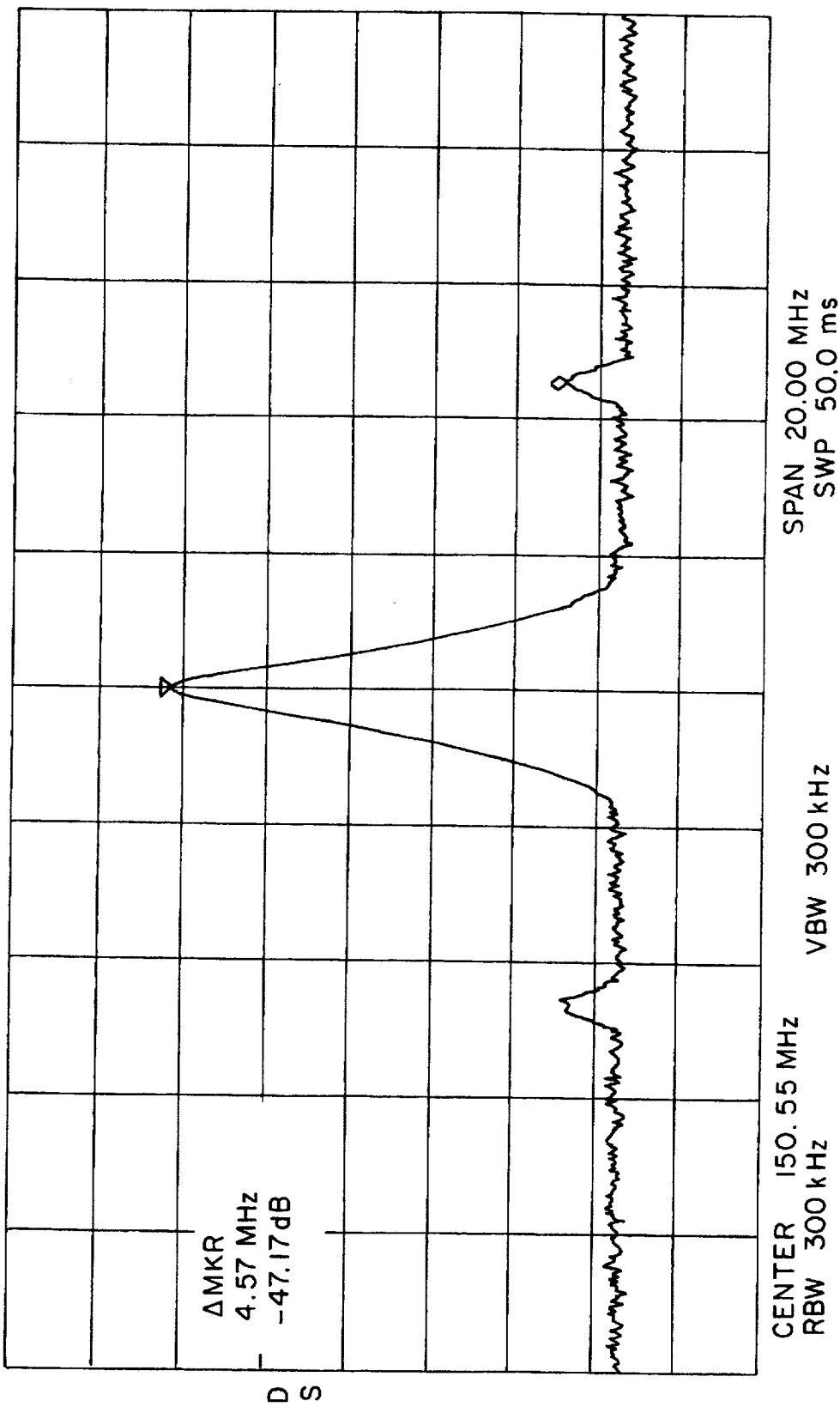
FIG. 3 is a graph of an RF-spectrum of a pulse train generated at 150.5 MHz by the embodiment of FIG. 1.

An RF-spectrum of a pulse train generated at 150.5 MHz is shown in FIG. 3, where the side-bands at the fundamental cavity round-trip time are suppressed by about −47 dB. The corresponding maximum pulse to pulse jitter within one cavity round-trip time (PPJC) was observed on a fast oscilloscope to be less than 100 psec in this case. Note that for repetition rates anywhere between 25 and 250 MHz, stable passive harmonic modelocking with a similar jitter performance (i.e. a PPJC<300 psec) can be obtained. The PPJC reduces with a reduction in output coupling, i.e., for an output pulse energy of less than 10 pJ, a side-band suppression of more than 50 dB can be obtained. The use of active pump-power stabilization gives a side-band suppression as high as 70 dB.

All of these repetition rates can be obtained without changing the polarization state in the laser and are perfectly stable for a given stable pump power level. Also, mechanical perturbations can be applied to the laser without affecting the pulse repetition rate. However, mechanical perturbations could lead to a short-lived increase in the pulse jitter. As acousto-optic pulse interactions are typically subject to strong resonances at well-defined pulse repetition rates, it is believed that acousto-optic interactions can typically induce stable passive harmonic modelocking only near those resonances (see Pilipetskii et al, Opt. Lett. 20, 907, (1995)) and not in the whole frequency range that is possible with the saturable absorbers. Thus the use of acousto-optic interactions alone cannot lead to truly adjustable pulse repetition rates as demonstrated here.

4) The dispersion in the above laser was also adjusted (by changing the length of the undoped fiber) and it was found that passive harmonic modelocking was possible for all values of overall negative cavity dispersion, but passive harmonic modelocking was not possible for large values (>50000 fsec$^2$) of positive cavity dispersion.

5) Finally, experiments were also performed by replacing the erbium-doped fiber with fiber with higher erbium doping levels. A saturable absorber with a carrier life time of ≦10 nsecs typically could not induce any passive harmonic modelocking for cavities with fundamental repetition rates >20 MHz and rather continuous Q-switching of the laser was observed. Thus the carrier life-time of the saturable absorber should be around one order of magnitude smaller than the cavity round-trip time to enable passive modelocking. Similar observations have also been made in other laser systems modelocked by semiconductor saturable absorbers, where the onset of Q-switching for extensively long carrier life-times was linked to the stability of the laser against the growth of intracavity power fluctuations, (e.g., U. Keller et al., Opt. Lett., 18, 217 (1993)).

Hence it is hereby shown that the use of saturable absorbers with carrier life-times about one order of magnitude shorter than the cavity round-trip time cannot only initiate passive modelocking, but also stabilize passive harmonic modelocking.

The selection of a particular saturable absorber for passive harmonic modelocking is governed by two stability boundaries:

1) Absorbers with life-times comparable to the cavity round-trip cannot initiate any type of passive modelocking, as the laser then starts to Q-switch continuously.
2) Absorbers with life-times <<cavity round-trip time cannot initiate passive modelocking, as the pulses in the cavity stay together in bunches.

As a passive harmonically modelocked fiber laser is a highly complex nonlinear system, a variety of effects play a role in the stabilization of the pulse repetition rates. A long-lived pulse repulsion force seems to directly originate from the saturable absorbers, as the stabilization is carrier life-time dependent. Further, nonlinear polarization evolution can lead to optical limiting in the cavity (C. R. Doerr et al., Opt. Lett., 19, 31 (1994)), which in the presence of the saturable absorber can lead to pulse separation.

Indeed optical limiting is present whenever passive harmonic modelocking is obtained, as verified by varying the pump power to the laser and monitoring the output pulse energy of the laser and the pulse energy of the signal rejected at the intra-cavity polarizer (by using a fast photodetector). Whereas a variating of the applied pump power leads to corresponding variations in the rejected pulse energy at the polarizer, the output pulse energy stays nearly constant (i.e. a variation of the rejected pulse energy of ±50% is accompanied with a variation of the output pulse energy of less than ±5%). As optical limiting arises from the sinusoidal response of the nonlinear reflectivity on the differential nonlinear phase delay between the two linear polarization eigenmodes of the laser (see C. R. Doerr et al.), a saturation of the reflectivity can thus be obtained at a given pulse energy (i.e. for a given nonlinear phase delay of the pulses oscillating in the laser). Hence any pump power variations are absorbed and a stable amplitude of all the pulses within one cavity round-trip time is obtained. Indeed, to obtain passive harmonic modelocking it is highly beneficial that a polarization state is selected that allows for optical limiting.

As optimized saturable absorber designs for passive harmonic modelocking have been described above, it is equally possible to use those absorbers for the stabilization of pulse repetition rates in cladding-pumped passive harmonically modelocked fiber lasers, which thus allow the replacement of the MOPA pump lasers with inexpensive diode array lasers.

Figure 4:
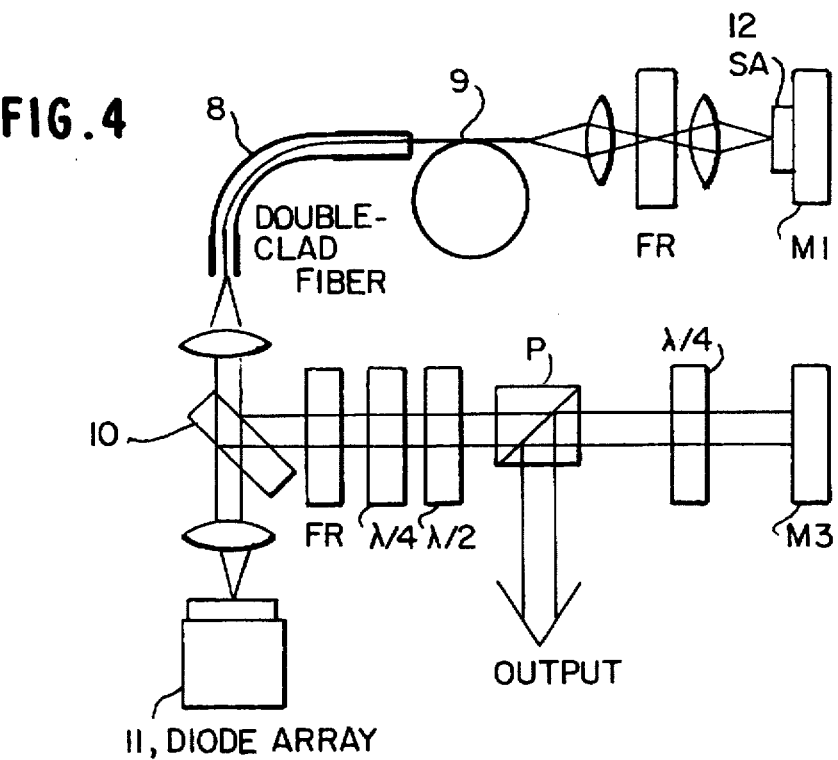
FIG. 4 is a diagram showing an embodiment of the present invention including a cladding pumped passive harmonically modelocked fiber oscillator.

An embodiment of a cladding pumped passive harmonically modelocked fiber oscillator is shown in FIG. 4. A single 4 m length of Er$^{3+}$-doped fiber 8 sensitized by Yb$^{3+}$, which is used as a gain medium (J. D. Minelly et al., IEEE Photonics Technlogy Lett., 5, 301 (1993)) to allow pumping of the Er$^{3+}$ via energy transfer from Yb$^{3+}$. The fiber 8 is doped with around 800 ppm (per mole) Er and around 8000 ppm (per mole) Yb. The core diameter is 6 μm and the numerical aperture is NA=0.16. To be able to use saturable absorbers with carrier life-times of 20 nsec, the cavity length is adjusted to give a fundamental cavity round-trip time of around 100 nsec. Therefore a length of 6.6 m of undoped Corning SMF-28 fiber 9 is added to the cavity. As a 0.6 m length of undoped Corning DC-fiber (positive dispersion fiber not shown) is also part of the cavity, the total cavity round trip time is 120 nsec, giving a fundamental pulse repetition rate of 8.33 MHz. The round-trip dispersion of the cavity was estimated at $D_2$=−0.26 psec$^2$.

The active fiber 8 is pumped through a dichroic mirror 10 with a standard 1 W, 100×1 μm broad area diode array 11 operating at 973 nm. Using an imaging system with a magnification of 1, a coupling efficiency can be obtained of up to 60% into the inner cladding of the active fiber. As in experiments described above, nonlinear polarization evolution is used per Fermann et al, Opt. Lett. 19, 43 (1994), as the steady-state modelocking mechanism and for optical limiting, where an environmentally stable cavity similar to the one described above is used. For pulse start up, and to enable passive harmonic modelocking, an InGaAsP saturable absorber 12 with a measured carrier life-time of 15 nsec can be used. For experimental convenience, the absorber 12 is located on the end opposite the pump.

Due to the large number of intra-cavity elements and the relatively inefficient fiber, a maximum cw output power of only 7.5 mW is obtained from the laser of FIG. 4. Under modelocked operation, the maximum output power was 2.5 mW. At a maximum pulse repetition rate of 128.6 MHz this corresponds to a pulse energy of 20 nJ.

Figure 5:
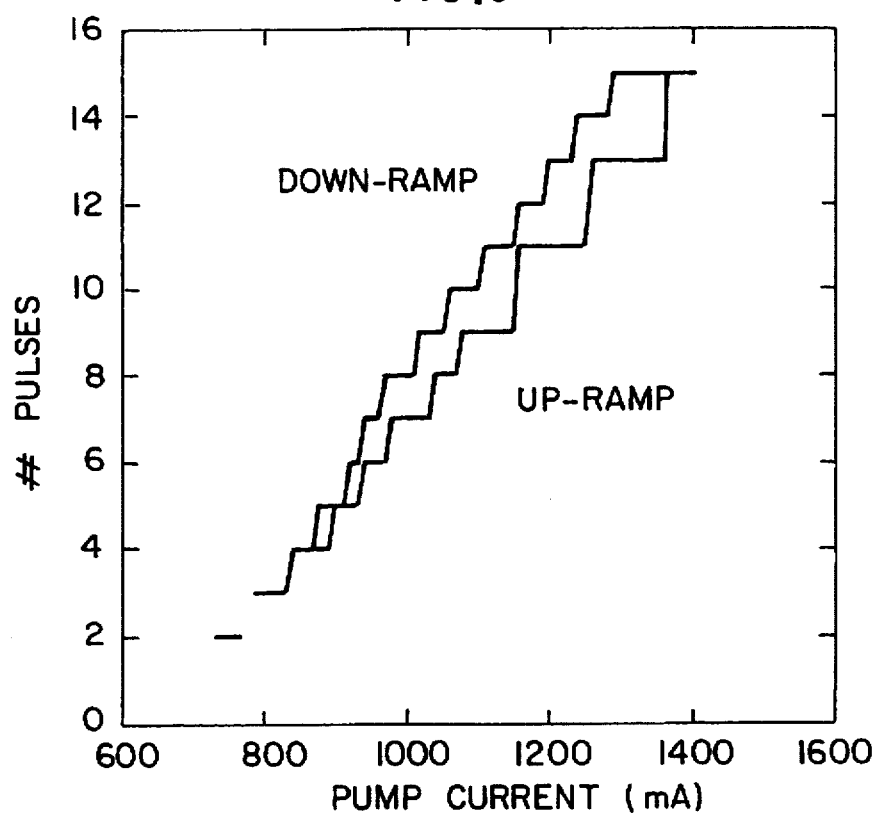
FIG. 5 is a graph showing the number of pulses in the cavity (#pc) measured when ramping the pump-current up and down in the embodiment of FIG. 4.

The number of pulses in the cavity (#pc) measured when ramping the pump-current up and down is shown in FIG. 5.

A pump current of 1400 mA corresponds to a launched pump power of ≈500 mW. In this experiment the pump power was ramped up and down by hand, where care was taken not to 'miss' a stability regime for a certain #pc. A significant amount of hysteresis is observed between up and down-ramping of the pump power. Whereas in up-ramping the laser occasionally adds more than one pulse to the cavity from the previous #pc, in down-ramping the #pc drops reliably one by one (at least for these relatively low #pc). Thus, the lower stability limit for a certain #pc is better defined.

Further, when the pump power is ramped quickly (by switching on the laser diode), a higher #pc is typically obtained compared to a slow ramp speed. At least for these relatively low #pc, the #pc is a very reproducible function of both pump-power and ramp-speed. Long-term drift may be further excluded by decreasing the relatively long length of low-birefringence fiber.

Typically the lowest pulse jitter was obtained in the middle of each stability plateau, where a PPJC of less than 300 psec was obtained for all frequencies ≧33 MHz. A decrease in pulse jitter was observed with an increase in repetition rate and a PPJC as low as 50–100 psec was obtained at pulse rates around 100 MHz. For a PPJC of less than 100 psec, a side-band suppression of ≧50 dB has been obtained.

With this embodiment, the pulses should have a FWHM pulse width of ≈600 fsec. Pulses with widths between 200–300 fsec can be easily obtained by dispersion compensating the cavity with a longer length of the positive dispersion fiber in the cavity.

Finally, the present invention can also be used to enable cladding pumped fiber lasers to operate at higher repetition rates with higher average powers. Apart from a reduction of the intra-cavity losses, the output power can be increased by employing double-clad fibers with larger primary claddings, which allow the use of broader, higher power pump diodes. Therefore, pulse repetition rates up to at least 1 GHz with corresponding cw output powers up to 20 mW are very feasible.

Hence, the present invention provides for passive harmonic modelocking induced by saturable absorbers in fiber lasers for the first time. Accordingly, saturable absorbers can not only be used for the initiation of passive modelocking and for pulse shaping in passive modelocking, but also for the minimization of pulse jitter in passive harmonic modelocking. Thus the use of saturable absorbers allows the construction of passively modelocked lasers with repetition rates that are adjustable by changing the pump power level to the laser. The use of environmentally stable cavity designs also allows the exploitation of Kerr-type nonlinearities and optical limiting for a further increase in the stability of these lasers. The use of double-clad fibers allows the use of inexpensive diode array lasers for pumping of the fiber lasers.

Though the embodiments described herein include a system based on erbium-doped fibers as the gain medium, naturally any other rare-earth-doped fiber could be used instead.

Figure 6:
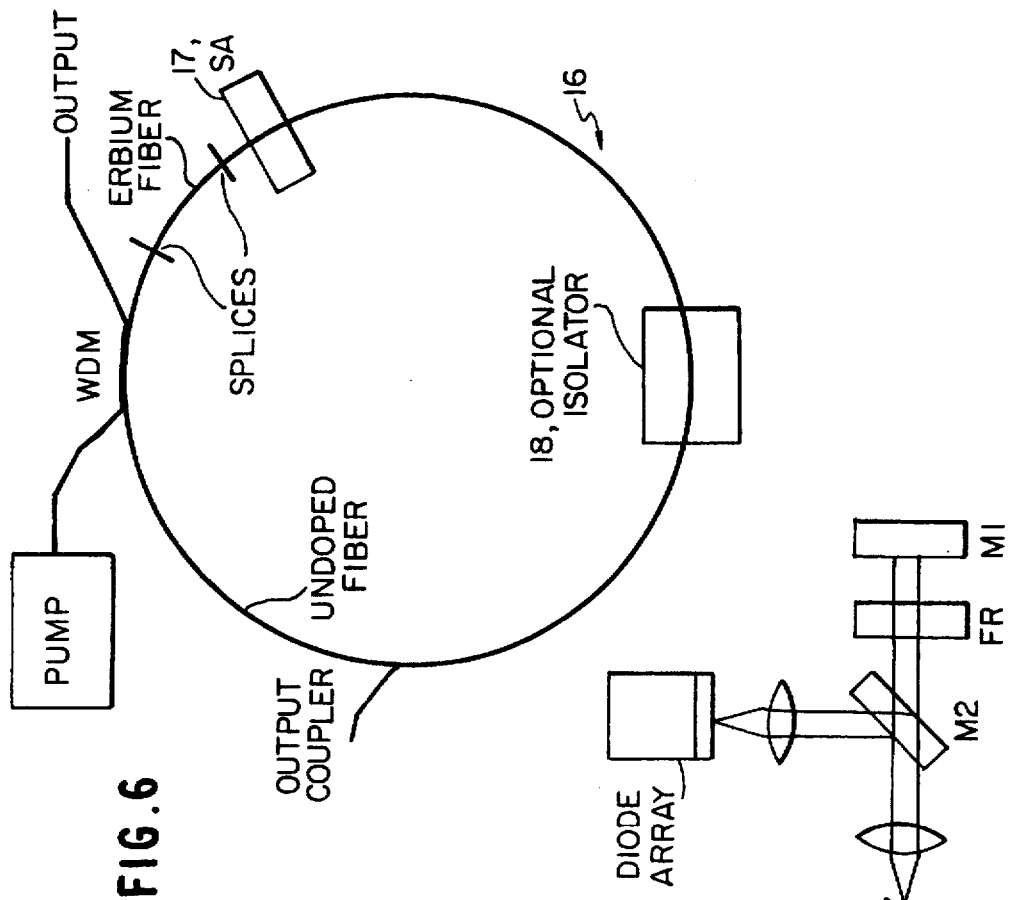
FIG. 6 is a diagram of the cavity set-up for an embodiment of the present invention wherein the standing wave cavity is replaced with a ring-cavity and a saturable absorber operates in transmission, and co-directional or uni-directional operation is selected with a fiber isolator.

In another alternative embodiment, the standing wave cavity can be replaced with a ring-cavity 16 and a saturable absorber 17 operating in transmission, where co-directional or uni-directional operation is selected with a fiber isolator 18. A generic cavity set-up for such a system is shown in FIG. 6. Again double-clad and dispersion-compensation fiber could also be used here. Additional output coupling could be obtained with a separate all-fiber coupler (not shown).

Figure 7:
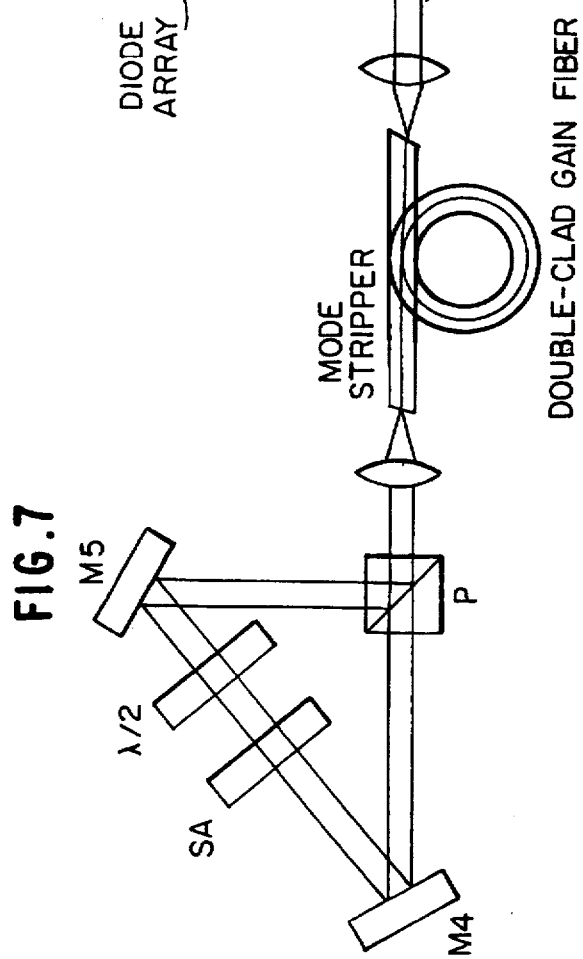
FIG. 7 is a diagram of an embodiment of the present invention using optical loops in the cavity.

FIG. 7 shows another alternative embodiment, wherein the two cavity designs described above can be modified by using optical or fiber loops in the cavity. Again either saturable absorbers operating in transmission or reflection can be used. Here, the arrangement with the polarizer P and cavity mirrors M4, M5 could be replaced with an all-fiber version. Alternatively, an all-fiber loop could be used on both ends of the gain fiber. For the case of all-single-mode fiber, mirror M2 could be replaced with an all-fiber wavelength-division multiplexing coupler; in the case of double-clad fiber a multi-mode wavelength-division multiplexing coupler could be used.

Figure 8:
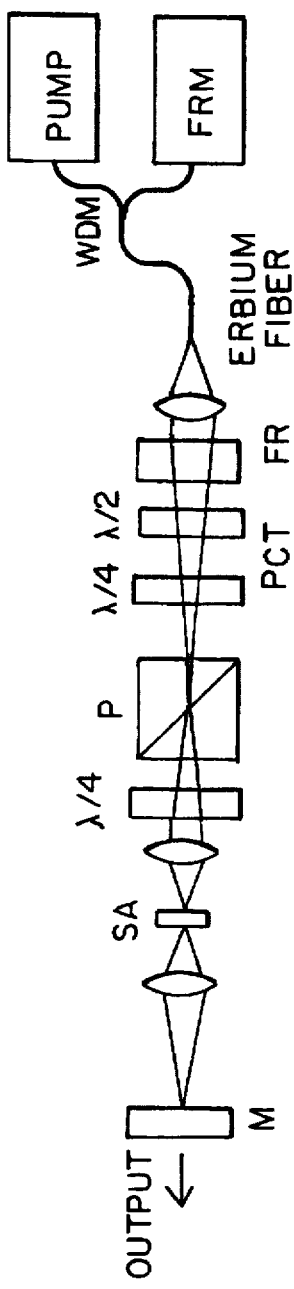
FIG. 8 is a diagram of an environmentaly stable, harmonically partitioned fiber laser.

In yet another alternative embodiment, harmonic partitioning can be used to minimize the pulse jitter in the above systems. An example of an harmonically partitioned cavity design is shown in FIG. 8. In FIG. 8, a standing wave cavity is shown with one saturable absorber SA, where the absorber is not located at a cavity end to enable harmonic partitioning (as explained in US Pat. No. 5,414,725 to Fermann et al.). The cavity length L and nL have also been described in that patent. Again output coupling could be obtained by using an additional fiber coupler (not shown).

As also shown in FIG. 8, harmonic partitioning is compatible with an environmentally stable cavity design, where nonlinear polarization evolution performs the pulse-shaping and provides for optical limiting.

Figure 9:
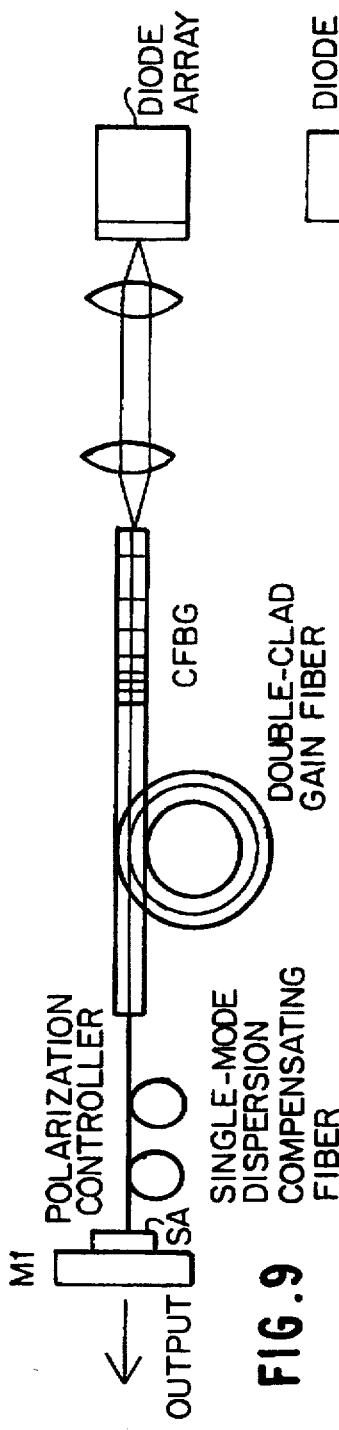
FIG. 9 is a diagram of an embodiment of the present invention having a chirped fiber Bragg grating for dispersion compensation inside the cavity.

In yet another alternative embodiment, a chirped fiber Bragg grating CFBG may be used for dispersion compensation inside the cavity. The chirped fiber Bragg grating may be spliced to the cavity or directly written into the gain fiber as shown in FIG. 9. Double-clad or single-clad fiber can be used here, where of course for single-mode fiber, the diode-array should be replaced with a single-mode diode laser.

Figure 10:
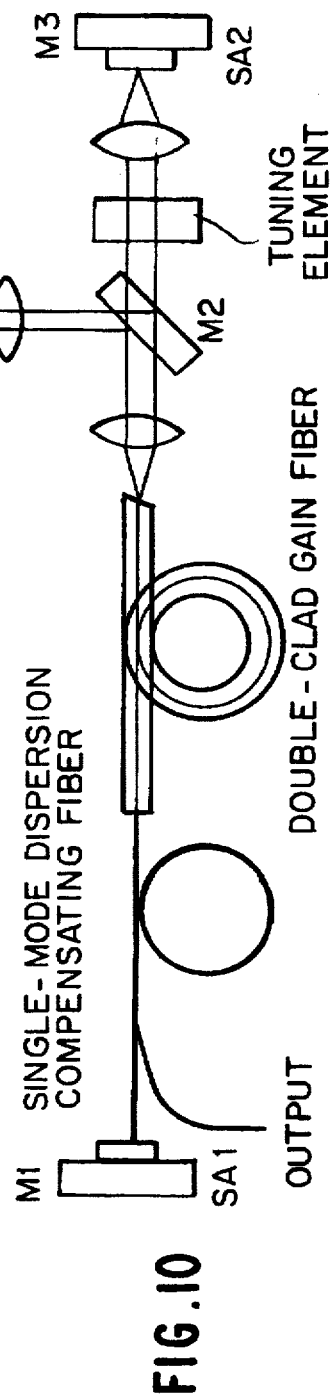
FIG. 10 is a diagram of an embodiment of the present invention having wavelength tuning elements incorporated into the cavity.

In yet another alternative embodiment shown in FIG. 10, wavelength tuning elements such as etalons, filters, birefringent tuning plates or bulk gratings can be incorporated into the cavities described above. As in the above examples, single-or double-clad fiber can be used and M2 can be replaced with an all-fiber wavelength-division multiplexing coupler. As shown in FIG. 10, more than one saturable absorber may be used in the cavity.

Figure 11:
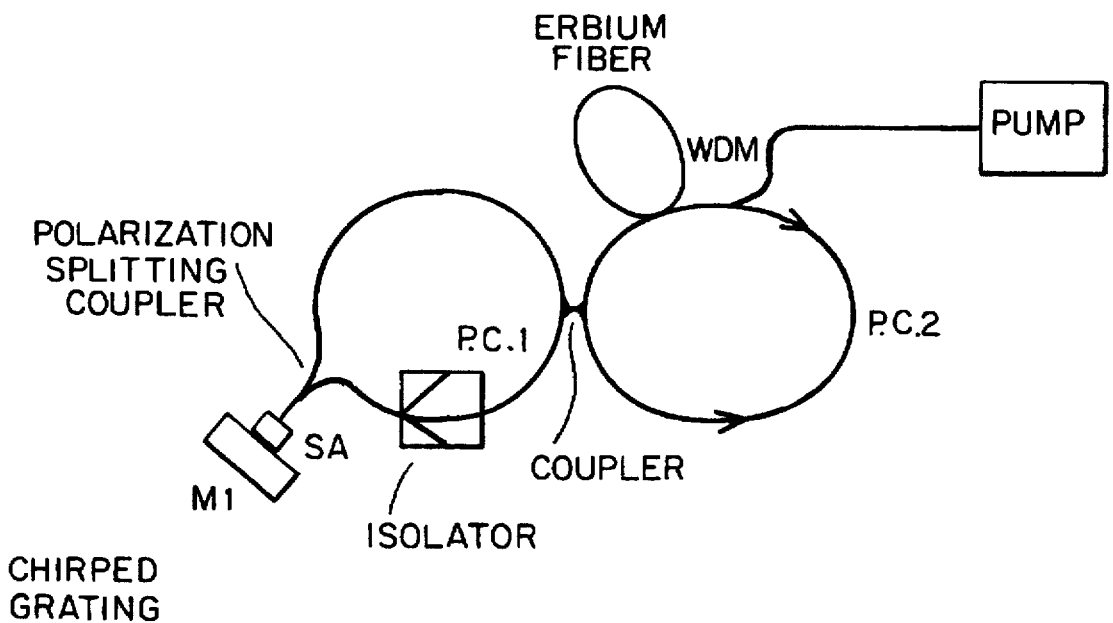
FIG. 11 is a diagram of an embodiment of the present invention having nonlinear all-fiber loops for passive harmonic modelocking.
Figure 11:
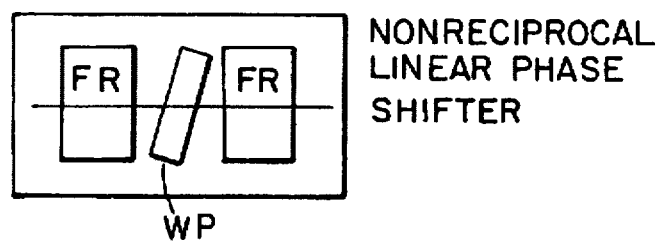

In yet another embodiment of the above invention shown in FIG. 11, nonlinear all-fiber loops are used for passive harmonic modelocking. Here, light propagates clockwise and counter-clockwise around the loop on the right-hand side of the cavity (see I. N. Duling III, Opt. Lett., 16, 539 (1991)). As the intensity levels are typically different for the two light paths, nonlinear pulse shortening and optical limiting can be obtained once the pulses interfere at the coupler. The whole fiber can be polarization-maintaining and a linear environmentally-insensitive phase shift can be induced between the clockwise and counter-clockwise propagating light by substituting the polarization controller PC2 with a nonreciprocal linear phase shifter as shown in the insert in FIG. 14. Instead of using a loop on the left-hand side of the cavity, a single lead of the coupler can be used and attached to the saturable absorber mirror. Equally, when only one of the coupler leads is used on the left-hand side of the cavity, a polarizer can be inserted between the end of the coupler lead and the saturable absorber. Further, for additional biasing of the coupler, a Faraday rotator can be inserted between the end of the coupler lead and the polarizer.

All journal articles and U.S. Patents cited herein are hereby expressly incorporated herein by reference. As many embodiments of the invention have been described herein, it will be apparent to those of skilled in the art that other modifications may be made within the scope of the invention, and it is intended that the full measure of the invention be determined with reference to the following claims.

I claim:

1. A passively modelocked laser comprising:
   means for optical pumping of the modelocked laser;
   an optical cavity for adjusting the energy of said laser;
   means for initiating and sustaining the production of short optical pulses in said cavity;
   an optical fiber gain medium for transmitting said optical pulses, said optical pulses having a repetition rate of integer multiples of the fundamental cavity frequency;
   means for outputting laser energy from said cavity;
   means for maximizing the separation of said pulses inside the cavity, including at least one semiconductor saturable absorber with a carrier life time shorter than the fundamental cavity round-trip time and longer than one hundredth of the cavity round-trip time; and
   means for providing optical limiting in the cavity to minimize pulse amplitude fluctuations.

2. The modelocked laser according to claim 1, where short pulses are sustained by a fast Kerr-nonlinearity.

3. The modelocked laser according to claim 2, wherein at least one of said saturable absorbers is butted to one end of said cavity, further comprising a partially reflective saturable absorber for output coupling.

4. The modelocked laser according to claim 2, further comprising a partially reflective saturable absorber for output coupling.

5. The modelocked laser according to claim 1, where optical limiting is induced by a fast Kerr-nonlinearity.

6. The modelocked laser according to claim 1, further comprising means for compensating linear phase drifts of said gain medium.

7. The modelocked laser according to claim 6, wherein said gain medium has a birefringence $>1\times10^{-7}$ to stabilize nonlinear pulse shaping by nonlinear polarization evolution.

8. The modelocked laser according to claim 7, further comprising a quarter and a half-wave plate to control the linear phase delay between two polarization eigenmodes of the fiber.

9. The modelocked laser according to claim 8, further comprising a polarizer, at least one cavity mirror, and a second quarter-wave plate located between said polarizer and the cavity mirror closest to the polarizer, for adjustable output coupling.

10. The modelocked laser according to claim 7, further comprising a polarizer, at least one cavity mirror, and a second quarter-wave plate located between said polarizer and the cavity mirror closest to the polarizer, for adjustable output coupling.

11. The modelocked laser according to claim 6, further comprising:
    a polarizer located at one end of said cavity;
    a double-clad fiber attached to said optical fiber;
    wherein said means for reflecting comprises a cavity end mirror located at a second end of said cavity; and wherein said means for compensating comprises:
    a first Faraday rotator located in front of said cavity end mirror; and
    a second Faraday rotator.

12. The modelocked laser according to claim 11, further comprising a quarter and a half-wave plate to control the linear phase delay between the two polarization eigenmodes of the fiber.

13. The modelocked laser according to claim 12, further comprising at least one cavity mirror, and a second quarter-wave plate located between said polarizer and the cavity mirror closest to the polarizer, for adjustable output coupling.

14. The modelocked laser according to claim 13, wherein one of said Faraday rotators is combined with a cavity mirror to constitute a Faraday rotator mirror.

15. The modelocked laser according to claim 13, wherein part of said optical fiber has a birefringence $>1e-7$ and another part of said optical fiber has a birefringence $<1e-7$, and the lower birefringence optical fiber is located in front of said cavity end mirror.

16. The modelocked laser according to claim 12, wherein part of said optical fiber has a birefringence $>1e-7$ and another part of said optical fiber has a birefringence $<1e-7$, and the lower birefringence optical fiber is located in front of said cavity end mirror.

17. The modelocked laser according to claim 11, wherein one of said Faraday rotators is combined with a cavity mirror to constitute a Faraday rotator mirror.

18. The modelocked laser according to claim 11, wherein part of said optical fiber has a birefringence $>1e-7$ and another part of said optical fiber has a birefringence $<1e-7$, and the lower birefringence optical fiber is located in front of said cavity end mirror.

19. A modelocked laser according to claim 11, wherein at least on of said saturable absorbers is located at a distance L away from one of the two cavity mirrors, to create a harmonically partitioned cavity.

20. The modelocked laser according to claim 6, wherein at least one of said saturable absorbers is butted to one end of said cavity.

21. The modelocked laser according to claim 6, further comprising a partially reflective saturable absorber for output coupling.

22. The modelocked laser according to claim 6, further comprising a quarter and a half-wave plate to control the linear phase delay between two polarization eigenmodes of the fiber.

23. The modelocked laser according to claim 22, further comprising a polarizer, at least one cavity mirror, and a second quarter-wave plate located between said polarizer and the cavity mirror closest to the polarizer, for adjustable output coupling.

24. The modelocked laser according to claim 1, further comprising means for controlling the dispersion in said cavity, consisting of one of dispersion compensating fiber and chirped fiber Bragg gratings.

25. The modelocked laser according to claim 24, where said chirped fiber Bragg grating is written directly into said gain medium and said gain medium is pumped through said chirped fiber Bragg grating.

26. The modelocked laser according to claim 24, wherein at least one of said saturable absorbers is butted to one end of said cavity.

27. The modelocked laser according to claim 24, further comprising a partially reflective saturable absorber for output coupling.

28. The modelocked laser according to claim 1, wherein said gain medium is a glass-fiber doped with a rare-earth material.

29. The modelocked laser according to claim 1, wherein said gain medium comprises a glass-fiber doped with a rare-earth material and a double cladding, and is pumped by a diode array.

30. The modelocked laser according to claim 1, wherein at least one of said saturable absorbers is butted to one end of said cavity.

31. The modelocked laser according to claim 1, wherein a fiber coupler is used for output coupling.

32. The modelocked laser according to claim 1, further comprising a partially reflective saturable absorber for output coupling.

33. The modelocked laser according to claim 1, where said fiber has a birefringence $<5\times10^{-7}$.

34. The modelocked laser according to claim 1, wherein said optical fiber is arranged to form a ring cavity.

35. The modelocked laser according to claim 1, wherein said cavity comprises a fiber loop.

36. The modelocked laser according to claim 1, wherein said cavity comprises an optical loop.

37. The modelocked laser according to claim 36, further comprising:

one of a single mode and a double-clad fiber gain medium;

a Faraday rotator mirror having a Faraday rotator and a mirror, for compensating for linear phase drifts in said double-clad fiber and said optical fiber;

a polarizer; and a half-wave plate cooperating with said polarizer to compensate for any polarization rotation induced by said Faraday rotator mirror.

38. A modelocked laser according to claim 1, further comprising wavelength tuning elements including at least one of etalons, optical filters, birefringent tuning plates and bulk gratings.

39. A modelocked laser according to claim 1, wherein one of said saturable absorbers is located at a round-trip distance L away from a cavity mirror, and the rest of said cavity has a round-trip length nL (n=integer), such that a harmonically partitioned Fabry-Perot cavity is obtained.

40. The modelocked laser according to claim 1, wherein said means for pumping comprises a semiconductor diode laser.

41. The modelocked laser according to claim 40, wherein said semiconductor diode laser is one of a single mode diode laser and a diode array laser.

42. The modelocked laser according to claim 1, wherein said fiber has a birefringence $>1\times10^{-7}$.

* * * * *